J. L. GOOD.
Improvement in Meat-Choppers.

No. 126,632. Patented May 14, 1872.

Witnesses.
John Bender
H. C. Stauffer

Inventor.
Jacob L. Good,
per J. Stauffer atty

UNITED STATES PATENT OFFICE.

JACOB L. GOOD, OF ELIZABETHTOWN, PENNSYLVANIA.

IMPROVEMENT IN MEAT-CHOPPING MACHINES.

Specification forming part of Letters Patent No. 126,632, dated May 14, 1872.

Specification describing certain Improvement in Meat-Chopping Machines, invented by JACOB L. GOOD, of Elizabethtown, in the county of Lancaster and State of Pennsylvania.

My improvement relates to a certain class of chopping-machines provided with a revolving block and long-handled choppers, actuated by lifters and springs. While it is desirable to have the balance-wheel, pinions, and cogged driving-wheel, my object in experimenting was so to concentrate and arrange the gearing as to occupy less space, cost less, and be more efficient, than in my previous arrangement, as well as that of others known to me.

Figure 1:
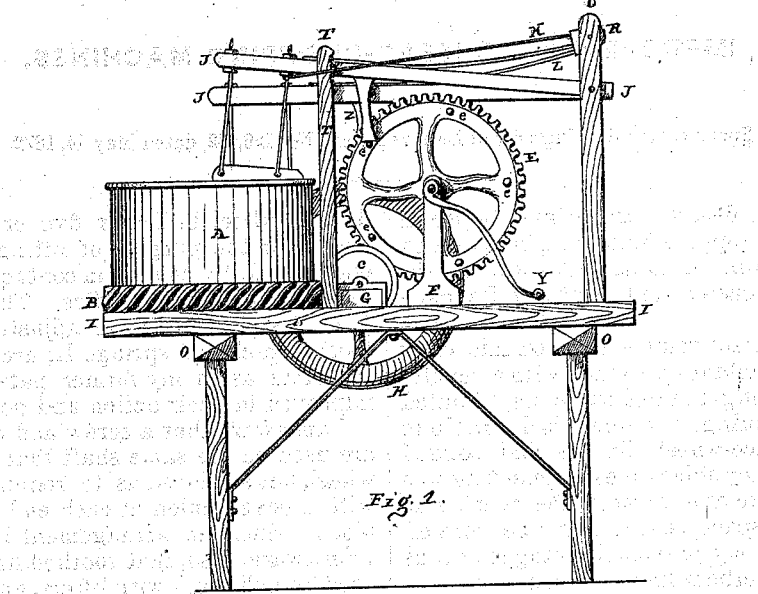
Figure 2:
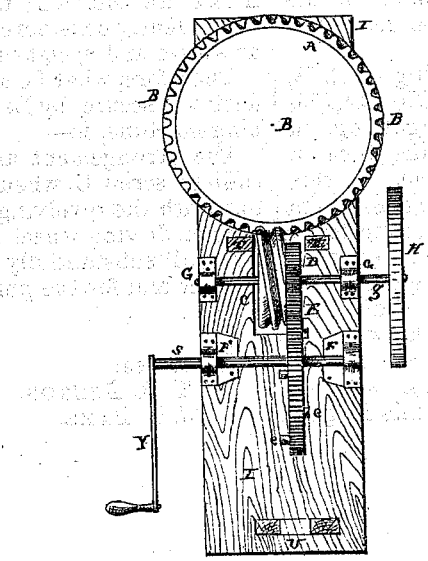

Figure 1 shows a side elevation of all the parts. Fig. 2 illustrates the arrangement of the gearing.

The only change, in the revolving block B, from my patent of May 16, 1871, No. 114,799, is, instead of ratchet teeth or upright cogs on the top of the circumference, I make them on the outer edge and slightly oblique. In this position they are less liable to clog from bits of meat dropping on them than when upright; but the object is chiefly to revolve it by being brought in direct contact with an endless screw or screw-pinion, C, on the shaft that supports the cogged pinion D and fly-wheel H in its side bearings G, placed in advance of the ordinary cogged driving-wheel E, with its crank-handle Y. To both sides of this cogged driving-wheel E, I affix five or more lifting-pegs e for the purpose of lifting the handled choppers J, by coming in contact with the vertical leg Z on said handles. The spring block R on its pivot with the adjusting-rod L, and toothed-rack and springs K, are substantially the same as in my former patent, but much improved in their action and position.

I am aware that a screw and cogged pinion are used on the same shaft that bears the fly-wheel, but so placed as to require a long shaft with a bevel-pinion at each end to revolve the block. Such an arrangement I do not claim. I am aware, also, that toothed lifting cams are used by cylinders with lifters, and wheels with lifters are common; nor do I claim such, independently considered from my arrangement as shown and specified, as a whole.

Therefore, what I claim as my invention, and desire to secure by Letters Patent, in a chopping-machine, is—

The arrangement and combination of the endless screw C, when in direct communication with the revolving block B, the pinion D, cogged driving-wheel E and lifters e on the same, all substantially operating jointly in the manner and for the purpose specified.

JACOB L. GOOD.

Witnesses:
   T. H. ASHTON,
   J. T. BARE.